(12) United States Patent
Kuroiwa et al.

(10) Patent No.: US 11,149,815 B2
(45) Date of Patent: Oct. 19, 2021

(54) SHOCK ABSORBER

(71) Applicant: Showa Corporation, Gyoda (JP)

(72) Inventors: Naoya Kuroiwa, Fukuroi (JP); Yosuke Fujikawa, Fukuroi (JP); Yosuke Murakami, Fukuroi (JP)

(73) Assignee: Showa Corporation, Gyoda (JP)

( * ) Notice: Subject to any disclaimer, the term of this patent is extended or adjusted under 35 U.S.C. 154(b) by 41 days.

(21) Appl. No.: 16/799,450

(22) Filed: Feb. 24, 2020

(65) Prior Publication Data

US 2020/0191233 A1 Jun. 18, 2020

Related U.S. Application Data

(63) Continuation of application No. PCT/JP2017/040620, filed on Nov. 10, 2017.

(30) Foreign Application Priority Data

Oct. 31, 2017 (JP) .............................. JP2017-209964

(51) Int. Cl.
*B60G 15/06* (2006.01)
*F16F 13/00* (2006.01)
(Continued)

(52) U.S. Cl.
CPC .......... *F16F 13/007* (2013.01); *B60G 15/063* (2013.01); *B60G 17/021* (2013.01);
(Continued)

(58) Field of Classification Search
CPC ........ F16F 13/007; B62K 25/04; B60G 15/06
(Continued)

(56) References Cited

U.S. PATENT DOCUMENTS

| 2008/0053764 | A1 | 3/2008 | Tomonaga et al. | |
| 2009/0277734 | A1* | 11/2009 | Cox ....................... | B60G 13/08 188/285 |
| 2013/0285300 | A1* | 10/2013 | Shimasaki ........... | B60G 15/061 267/221 |

FOREIGN PATENT DOCUMENTS

| JP | 03-025040 U | 3/1991 |
| JP | 05-014693 U | 2/1993 |

(Continued)

OTHER PUBLICATIONS

International Search Report dated Dec. 26, 2017 for the corresponding PCT International Patent Application No. PCT/JP2017/040620.

(Continued)

*Primary Examiner* — Christopher P Schwartz
(74) *Attorney, Agent, or Firm* — Leason Ellis LLP (57) ABSTRACT

A shock absorber includes a hollow rod, a suspension spring arranged outside the hollow rod, a spring receiver arranged to be displaceable with respect to the hollow rod and receiving a load of the suspension spring, an adjusting screw inserted into one end side of the hollow rod and configured to adjust a position of the suspension spring by restricting movement of the spring receiver to the one end side, and a shaft member which transmits a load received by the spring receiver to the adjusting screw inside the hollow rod. An insertion portion which extends in an axial direction of the hollow rod and into which the shaft member is inserted is provided on a side surface of the hollow rod.

11 Claims, 6 Drawing Sheets

(51) Int. Cl.
    *B60G 17/02* (2006.01)
    *B62K 25/04* (2006.01)
(52) U.S. Cl.
    CPC .................. *B60G 2202/312* (2013.01); *B60G 2204/1242* (2013.01); *B60G 2300/12* (2013.01); *B60G 2500/20* (2013.01); *B60G 2600/20* (2013.01); *B60G 2800/162* (2013.01); *B62K 25/04* (2013.01); *F16F 2228/066* (2013.01); *F16F 2230/0023* (2013.01)
(58) Field of Classification Search
    USPC .......................... 188/284–286; 280/275–279
    See application file for complete search history.

(56) References Cited

FOREIGN PATENT DOCUMENTS

| | | |
|---|---|---|
| JP | 05-067843 U | 9/1993 |
| JP | 10-038005 A | 2/1998 |
| JP | 2004-251430 A | 9/2004 |
| JP | 2013-231451 A | 11/2013 |

OTHER PUBLICATIONS

Extended European Search Report dated Jul. 21, 2021 for the corresponding European Patent Application No. 17930636.0.

* cited by examiner

SHOCK ABSORBER

CROSS-REFERENCE TO RELATED APPLICATIONS

This application is a continuation of PCT application No. PCT/JP2017/040620 filed on Nov. 10, 2017, which claims the benefit to Japanese Patent Application No. 2017-209964 filed on Oct. 31, 2017, the contents of which are incorporated herein by reference.

TECHNICAL FIELD

The present invention relates to a shock absorber which buffers an impact from a road surface.

BACKGROUND ART

In PTL 1, a hydraulic shock absorber where a push rod is placed through a hollow portion of a hollow rod and a suspension spring is pressurized by the push rod, and further the push rod is moved up and down by an adjuster to adjust a spring load of the suspension spring is disclosed.

PTL 1: JP-A-2013-231451

SUMMARY OF INVENTION

Depending on the structure of a shock absorber, a suspension spring may not be arranged at a tip end of a hollow rod because a piston is arranged at the tip end of the hollow rod. In this case, it is necessary to arrange the suspension spring outside the hollow rod. A spring load adjusting mechanism described in PTL 1 cannot be applied to a structure in which a suspension spring is disposed outside a hollow rod.

An object of the invention is to provide a shock absorber capable of setting a position of a suspension spring with a simple configuration in a configuration in which the suspension spring is arranged outside a hollow rod.

To solve the problem described above, according to an aspect of the invention, there is provided a shock absorber which includes a hollow rod, a suspension spring arranged outside the hollow rod, a spring receiver arranged to be displaceable with respect to the hollow rod and receiving a load of the suspension spring, an adjusting screw inserted into one end side of the hollow rod and configured to adjust a position of the suspension spring by restricting movement of the spring receiver to the one end side, and a shaft member which transmits a load received by the spring receiver to the adjusting screw inside the hollow rod, where, on a side surface of the hollow rod, an insertion portion which extends in an axial direction of the hollow rod and into which the shaft member is inserted is provided.

According to the aspect of the invention, it is possible to provide a shock absorber capable of setting a position of a suspension spring with a simple configuration in a configuration in which the suspension spring is disposed outside a hollow rod.

DESCRIPTION OF EMBODIMENTS

First Embodiment

Hereinafter, embodiments of the present invention will be described in detail. In the following, a direction from a vehicle body to an axle or an opposite direction may be referred to as an "axial direction". The axial direction is a direction parallel to an x-axis in FIG. 1 and the like. A direction (arbitrary direction parallel to a y-z plane) perpendicular to the axial direction may be referred to as a "radial direction".

Figure 1:
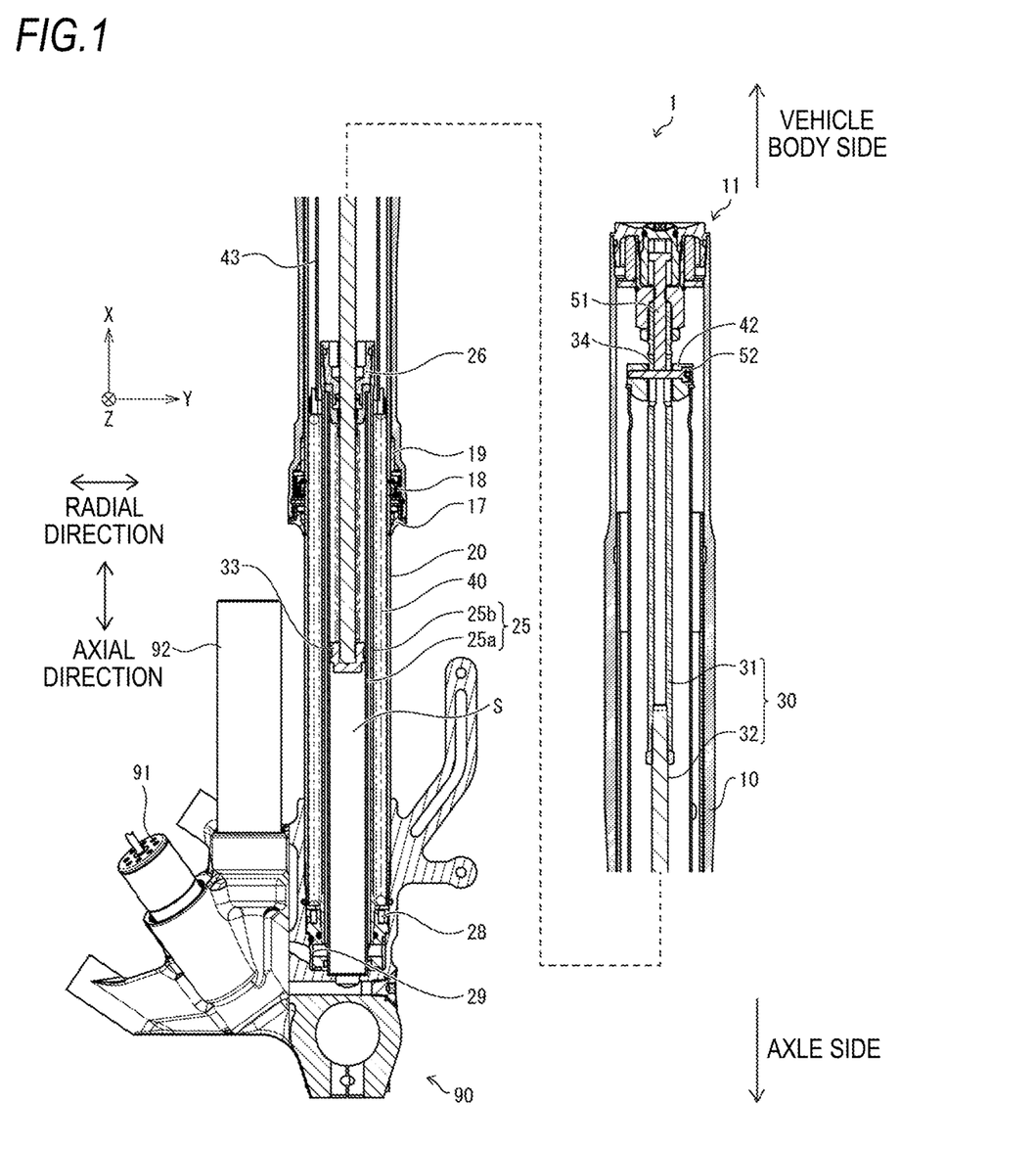
FIG. 1 is a cross-sectional view illustrating a configuration of a shock absorber according to a first embodiment.

FIG. 1 is a cross-sectional view illustrating a configuration of a shock absorber 1 according to the present embodiment. As illustrated in FIG. 1, the shock absorber 1 includes an outer tube 10 (cylinder), an inner tube 20, and an inner rod 30 (hollow rod).

The shock absorber 1 is an inverted-type shock absorber in which the outer tube 10 is disposed on a vehicle body side (one end side) and the inner tube 20 is disposed on an axle side (the other end side). Further, the shock absorber according to an aspect of the invention may be an upright-type shock absorber in which the outer tube is disposed on the axle side and the inner tube is disposed on the vehicle body side.

The outer tube 10 is a cylindrical member having one end fixed to the vehicle body side and the other end opened to the axle side. The inner tube 20 is a cylindrical member having one end fixed to the axle side and the other end opened to the vehicle body side. The inner tube 20 is inserted into the outer tube 10 from the axle side. A bush 19 is provided on an axle-side inner peripheral surface of the outer tube 10 and the outer tube 10 is slidable with respect to the inner tube 20. Further, an oil seal 18 and a dust seal 17 are provided at an axle-side end portion of the outer tube 10.

The inner rod 30 is a rod which is inserted into an oil chamber cylinder 25 (described below) from the vehicle body side and has a piston 33 at an axle-side end portion. Specifically, the inner rod 30 has a configuration in which a hollow first rod 31 located on the vehicle body side and a solid second rod 32 located on the axle side are connected. The piston 33 is disposed at the axle-side end portion of the second rod 32. Even in a state where the shock absorber 1 is most compressed, only the second-rod-32 portion of the inner rod 30 is inserted into the oil chamber cylinder 25.

The oil chamber cylinder 25 is a cylindrical member disposed coaxially with the inner tube 20 and is erected in the inner tube 20. The oil chamber cylinder 25 has a double structure in which an inner cylinder 25a and an outer cylinder 25b are arranged coaxially. A rod guide 26 through which the inner rod 30 passes is provided at the vehicle-body-side end portion of the oil chamber cylinder 25. The piston 33 disposed on the axle side of the inner rod 30 slides liquid-tightly with respect to the inner cylinder 25a. An oil chamber S is defined by the inner cylinder 25a and the piston 33. The oil chamber S is filled with hydraulic oil.

An attachment member 90 for attaching the shock absorber 1 to the axle is provided at the axle-side end portions of the inner tube 20 and the oil chamber cylinder 25. The attachment member 90 is provided with a damping force generator 91 and a sub tank 92.

The damping force generator 91 generates a damping force by the flow of hydraulic oil generated by the reciprocating motion of the piston 33. A communication hole 29 which allows the oil chamber S and the damping force generator 91 to communicate with each other is provided in the vicinity of the axle-side end portion of the inner cylinder 25a.

The sub tank 92 communicates with the oil chamber S via the damping force generator 91 and compensates for the hydraulic oil corresponding to the volume of the inner rod 30 entering the inner cylinder 25a.

A suspension spring 40 is provided outside the inner rod 30. Specifically, the suspension spring 40 is disposed in an annular space between the outer peripheral surface of the outer cylinder 25b outside the inner rod 30 and the inner peripheral surface of the inner tube 20. The suspension spring 40 is a member for buffering an impact applied to the shock absorber 1. A spring receiver 28 which abuts against the axle-side end portion of the suspension spring 40 is provided at the axle-side end portion in the inner tube 20.

A spring receiver 42 which receives the load of the suspension spring 40 is disposed on the vehicle body side of the suspension spring 40. In the embodiment, the spring receiver 42 is a cylindrical member into which the first rod 31 is inserted. However, the spring receiver 42 does not necessarily have a cylindrical shape and may have a shape in which a part of the cylindrical shape is removed, for example. The spring receiver 42 has a hole extending in a direction (more preferably, a radial direction perpendicular to the axial direction) intersecting the axial direction through which a pin (shaft member) 52 described below passes. The spring load received by the spring receiver 42 is transmitted to an adjusting screw 51 via the pin 52.

A cylindrical spring collar 43 is disposed between the suspension spring 40 and the spring receiver 42. The spring collar 43 transmits the load of the suspension spring 40 to the spring receiver 42. By adjusting the length of the spring collar 43, a suspension spring mechanism suitable for the distance between the spring receiver 42 and the axle-side spring receiver 28 can be configured without adjusting the length of the suspension spring 40. However, the spring collar 43 may be omitted and the suspension spring 40 may be disposed over the entirety between the spring receiver 42 and the axle-side spring receiver 28.

Figure 2A:
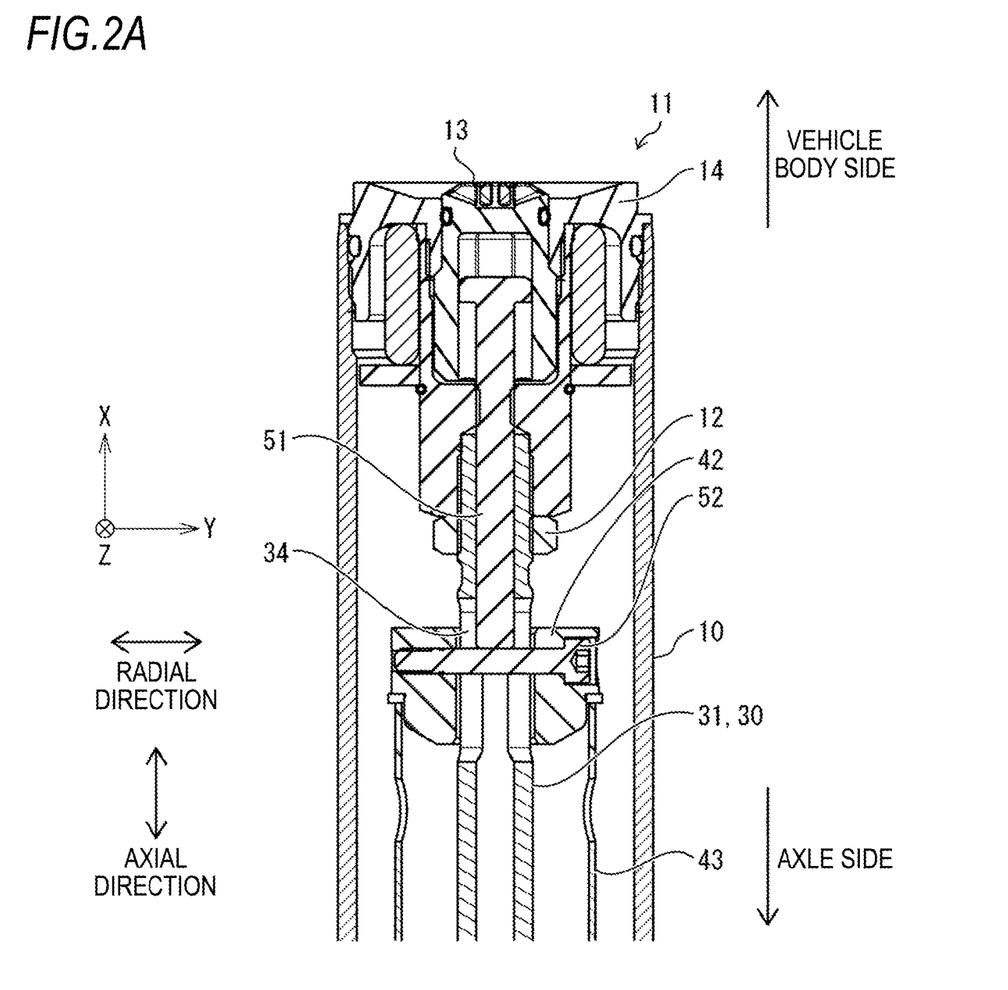
FIG. 2A is an enlarged cross-sectional view illustrating a structure in a vicinity of a vehicle-body-side end portion of the shock absorber according to the first embodiment.

FIG. 2A is an enlarged cross-sectional view illustrating the structure in a vicinity of the vehicle-body side end portion of the shock absorber 1. As illustrated in FIG. 2A, the adjustment screw 51 is inserted coaxially with the inner rod 30 at the vehicle-body-side end portion of the inner rod 30. Screw grooves (not illustrated) formed on the outer peripheral surface of the adjusting screw 51 and the inner peripheral surface of the inner rod 30 are screwed together. By rotating the adjusting screw 51, the first rod 31 can be moved up and down, whereby the spring collar 43 connected to the first rod 31 via the pin 52 and the spring receiver 42 can be moved up and down. Therefore, the load of the suspension spring 40 which comes into contact with the spring collar 43 can be adjusted.

The adjusting screw 51 may be any member as long as it has a function as a general screw. For example, a standard hexagon bolt can be used as the adjusting screw 51. Since standard hexagon bolts are less expensive than dedicated parts, the manufacturing cost of the shock absorber 1 can be reduced.

A pair of long holes (insertion portions) 34 into which the pin 52 is inserted are formed on the side surfaces of the inner rod 30. The long hole 34 may be formed by, for example, pressing or other processing methods (such as cutting). The long holes 34 are formed at two locations so as to face each other through the axis of the inner rod 30. The pin 52 passes through the two long holes 34 and is arranged perpendicular to the axial direction of the inner rod 30.

The long hole 34 extends in the axial direction of the inner rod 30. Accordingly, the pin 52 is movable along the axial direction of the inner rod 30 in a state where the pin 52 is inserted into the long holes 34. Therefore, the spring receiver 42 can be displaced with respect to the inner rod 30 by the length of the long hole 34.

Further, the pin 52 is in contact with the axle-side end portion of the adjusting screw 51 in a state where the pin 52 is inserted into the long hole 34. Therefore, the load received by the spring receiver 42 is transmitted to the adjusting screw 51 via the pin 52. The adjusting screw 51 adjusts the position of the vehicle-body-side end portion of the suspension spring 40 by restricting the movement of the spring receiver 42 to the vehicle body side via the pin 52. The load of the suspension spring 40 is adjusted by adjusting the position.

A cap member 11 is fitted into the vehicle-body-side end portion of the outer tube 10. The vehicle-body-side end portion of the inner rod 30 is inserted into the cap member 11. A relative position of the inner rod 30 with respect to the cap member 11 is fixed by a nut 12. Further, at least a part on the vehicle body side of the adjusting screw 51 is disposed inside the cap member 11.

Figure 2B:
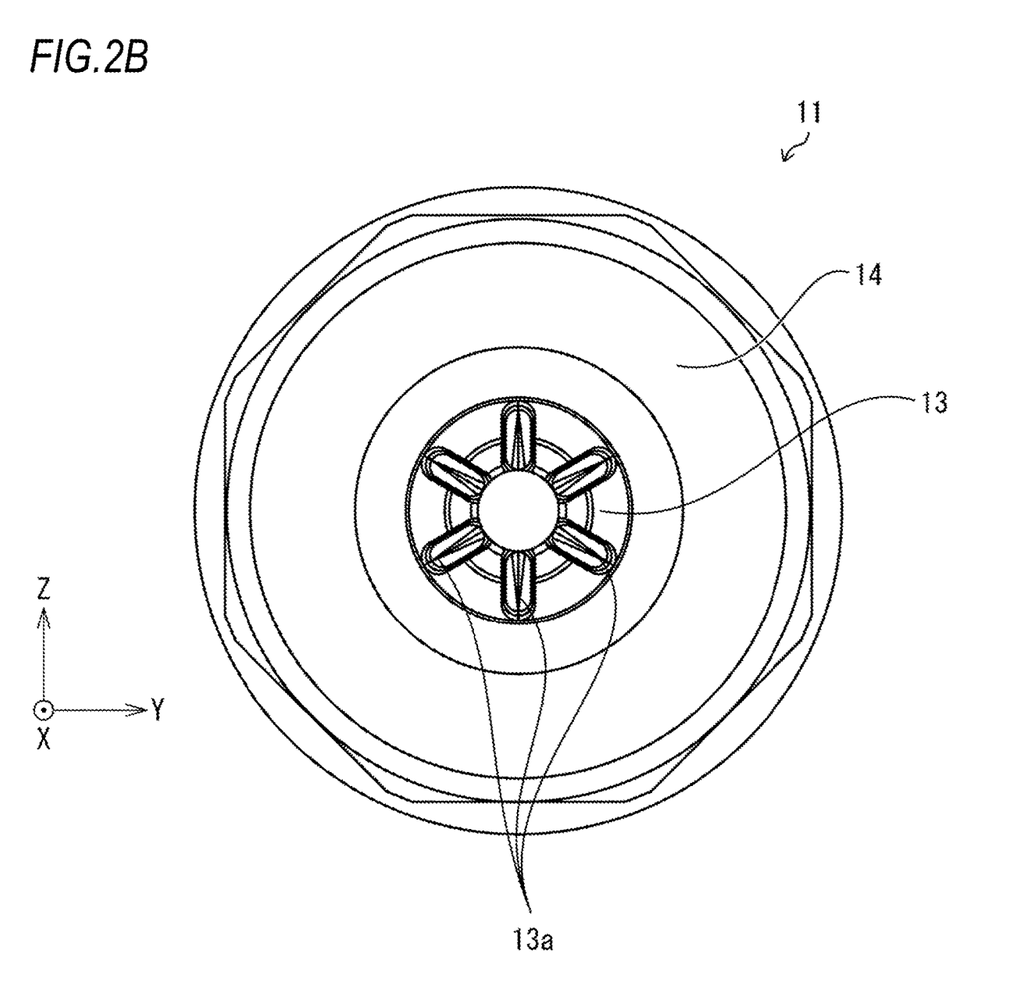
FIG. 2B is a top view illustrating an appearance of a user operation portion.

FIG. 2B is a view illustrating a state where the cap member 11 is viewed from the vehicle body side. As illustrated in FIGS. 2A and 2B, the cap member 11 includes a cap body 14 and an operation portion 13 which rotates the adjusting screw 51. The operation unit 13 may be a member which includes, for example, a fitting portion which fits with, for example, the head of the adjusting screw 51 on the axle side and is rotatable relative to the cap body 14 around the axis of the adjusting screw 51. The operation portion 13 includes a plurality of protrusions 13a on the surface on the vehicle body side. The operation portion 13 is rotated with respect to the cap body 14 by fitting a tool for rotating the operation portion 13 into the protrusion 13a and rotating the tool. By this operation, the adjusting screw 51 rotates and moves up and down in the axial direction.

The cap member 11 does not necessarily include the operation portion 13. For example, the cap member 11 may include a window portion which exposes the head of the adjusting screw 51 to the outside and may be configured to be directly accessible to the adjusting screw 51.

Figure 3:
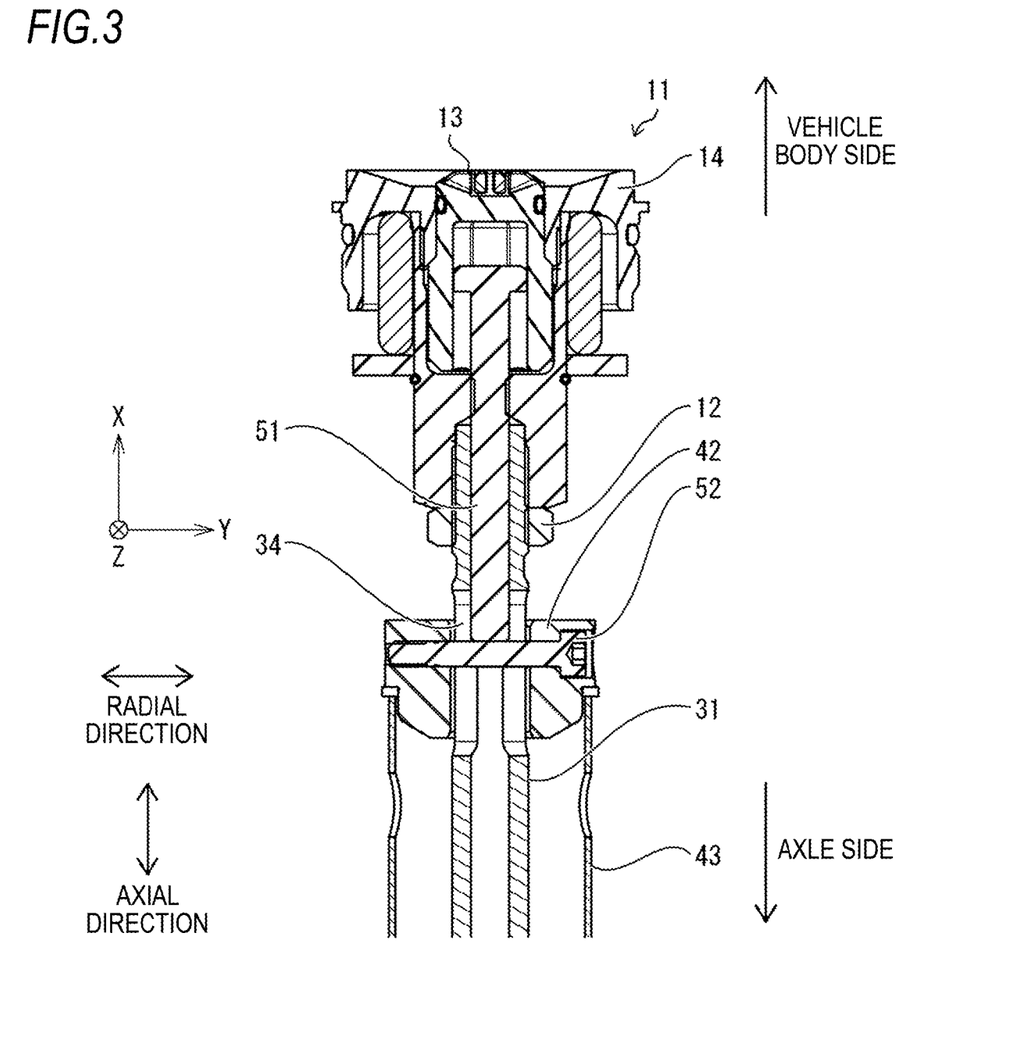
FIG. 3 is a cross-sectional view illustrating a state where an outer tube is removed from the shock absorber according to the first embodiment.

FIG. 3 is a cross-sectional view illustrating a state where the outer tube 10 is removed from the shock absorber 1. The description will be continued with reference to FIGS. 1 and 3. In the embodiment, the nut 12 is disposed further on the vehicle body side than the spring receiver 42. Therefore, as illustrated in FIG. 3, access to the nut 12 is not hindered by the spring receiver 42 and the spring collar 43. Therefore, as illustrated in FIG. 3, the nut 12 can be easily accessed without compressing the suspension spring 40 by simply removing the outer tube 10. The adjusting screw 51 and the cap member 11 can be removed from the inner rod 30 by removing the nut 12.

Figure 4:
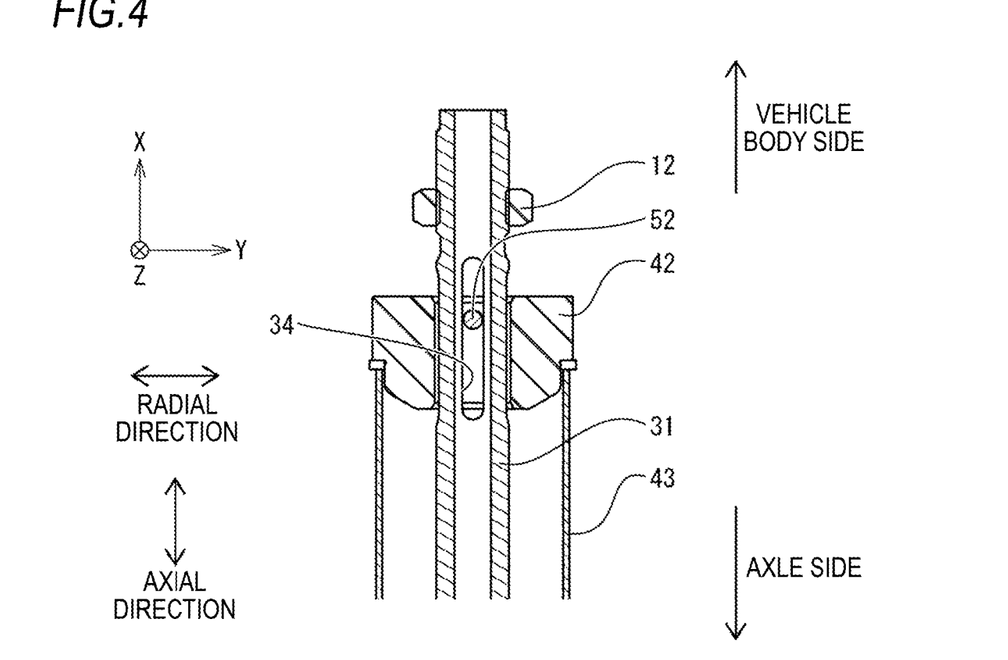
FIG. 4 is a cross-sectional view illustrating a state where an adjusting screw and a cap member are removed from the shock absorber in a state illustrated in FIG. 3.

FIG. 4 is a cross-sectional view illustrating a state where the adjusting screw 51 and the cap member 11 are removed from the shock absorber 1 in a state illustrated in FIG. 3. The description will be continued with reference to FIGS. 1 and 4. As illustrated in FIG. 4, in the shock absorber 1, the long hole 34 has a contour closed on the vehicle body side. That is, a dead end which restricts the movement of the pin 52 toward the vehicle body is formed in the long hole 34. Therefore, it is possible to prevent the pin 52, the spring receiver 42, and the spring collar 43 from jumping out due to the reaction force of the suspension spring 40 when the adjusting screw 51 is removed in the process of disassembling the shock absorber 1.

In the embodiment, the pin 52 is detachable from the spring receiver 42. When the pin 52 is detached (withdrawn) from the spring receiver 42, the movement of the spring receiver 42 toward the vehicle body side is not limited to the adjusting screw 51. In this case, not only the spring receiver 42 but also the suspension spring 40 can be moved to the vehicle body side in the same manner. Therefore, in the shock absorber 1 in the state illustrated in FIG. 4, the suspension spring 40 can be removed by a simple operation of pulling out the pin 52 from the spring receiver 42.

Thus, the shock absorber 1 is easier to disassemble than the shock absorber of the related art. In particular, when the shock absorber 1 is applied to a motorcycle used for a race or the like, the frequency of replacing the suspension spring 40 is higher than that applied to a general vehicle, and thus easy to disassemble is very important. Therefore, the shock absorber 1 can be suitably used for a motorcycle used for a race or the like.

<Effect>

As described above, the shock absorber 1 includes the inner rod 30, the suspension spring 40 disposed outside the inner rod 30, the spring receiver 42 which is disposed so as to be displaceable with respect to the inner rod 30 and receives the load of the suspension spring 40, the adjusting screw 51 which is inserted into one end side of the inner rod 30 and adjusts the position of the suspension spring 40 by restricting the movement of the spring receiver 42 to the vehicle body side, and the pin 52 which transmits the load received by the spring receiver 42 to the adjusting screw 51 inside the inner rod 30. The inner rod 30 has the long hole 34 which extends in the axial direction of the inner rod 30 and into which the pin 52 is inserted.

The load of the suspension spring 40 received by the spring receiver 42 is transmitted via the pin 52 to the adjusting screw 51 inserted into the vehicle body side of the inner rod 30. The pin 52 is fixed by being inserted into the long hole 34 formed on the side surface of the inner rod 30 and the adjusting screw 51 and the pin 52 are in contact with each other inside the inner rod 30. Further, the long hole 34 extends in the axial direction of the inner rod 30 and the pin 52 is movable in the axial direction along the long hole 34. Therefore, the position of the spring receiver 42 can be adjusted by moving the pin 52 in the axial direction by the adjusting screw 51, and as a result, the position of the suspension spring 40 can be set. Thus, even in the configuration in which the suspension spring 40 is disposed outside the inner rod 30, the position of the suspension spring 40 can be set with a simple configuration. Thereby, the spring load can be adjusted.

In the shock absorber 1, the long hole 34 is an opening portion having a closed contour. By making the long hole 34 into a shape having a closed contour instead of a notch groove, a dead end which restricts the movement of the pin 52 is formed on the vehicle body side. This dead end can prevent the pin 52, the spring receiver 42, and the suspension spring 40 from jumping out of the shock absorber 1 even when the load by the adjusting screw 51 is removed.

The shock absorber 1 includes the outer tube 10 arranged outside the suspension spring 40, the cap member 11 which is disposed in the opening portion on the vehicle body side of the outer tube 10 and into which the inner rod 30 is inserted, and the nut 12 for fixing the inner rod 30 to the cap member 11. The nut 12 is arranged further on the vehicle body side than the spring receiver 42.

Since the nut 12 which fixes the inner rod 30 to the cap member 11 is arranged further on the vehicle body side than the spring receiver 42, the suspension spring 40 which abuts on the spring receiver 42 does not hinder the access to the nut 12. Therefore, the suspension spring 40 can be easily exchanged.

The shock absorber 1 further includes the spring collar 43 disposed between the spring receiver 42 and the suspension spring 40.

By adjusting the length of the spring collar 43, the suspension spring mechanism suitable for the distance between the spring receiver 42 and the axle-side spring receiver 28 can be realized without adjusting the length of the suspension spring 40. Further, by disposing the nut 12 closer to the vehicle body side than the spring receiver 42, it is possible to prevent the access to the nut 12 from being hindered by the spring collar 43.

In the shock absorber 1, the pin 52 can be detachable from the spring receiver 42. Therefore, since the movement restriction of the spring receiver 42 toward the vehicle body side can be released by a simple operation of pulling out the pin 52 from the spring receiver 42, the suspension spring 40 can be easily replaced.

Further, in the shock absorber 1, at least a part of the vehicle body side of the adjusting screw 51 is disposed inside the cap member 11 and the cap member 11 includes the operation portion 13 which rotates the adjusting screw 51. Therefore, the initial load of the suspension spring 40 can be easily set by adjusting the position of the adjusting screw 51 by the operation portion 13.

Second Embodiment

Another embodiment of the invention will be described below.

Figure 5:
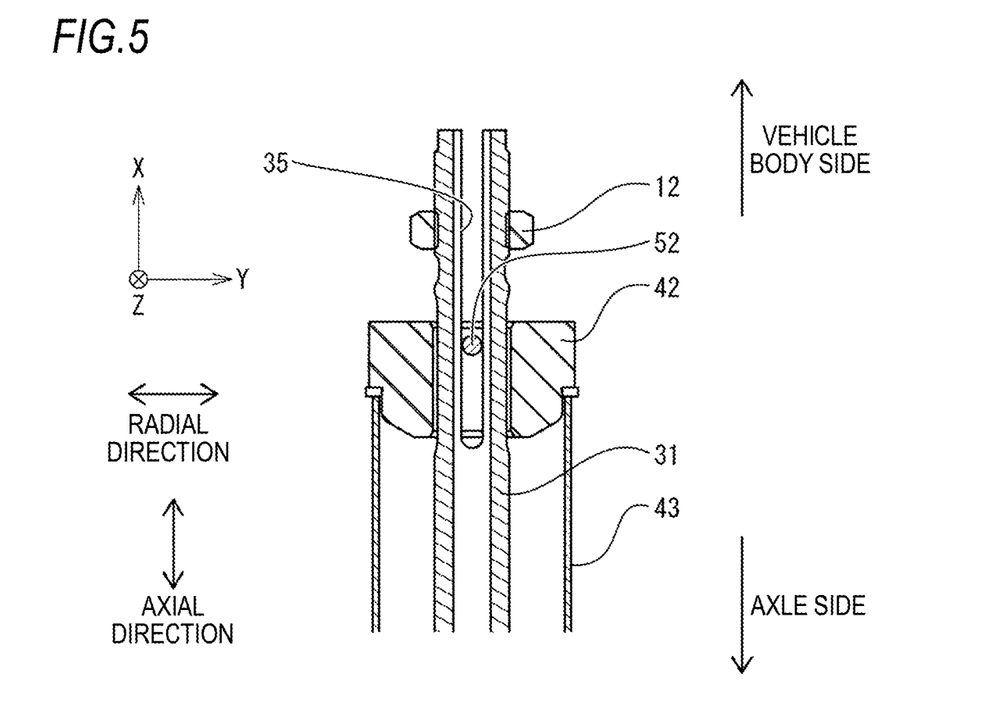
FIG. 5 is a cross-sectional view illustrating a configuration of a shock absorber according to a second embodiment.

FIG. 5 is a cross-sectional view illustrating the configuration of a shock absorber 2 according to the embodiment. The shock absorber 2 is different from the shock absorber 1 in that the inner rod 30 has a notch portion 35 instead of the long hole 34. The notch portion 35 extends in the axial direction of the inner rod 30, similarly to the long hole 34. On the other hand, the notch portion 35 is different from the long hole 34 in that the vehicle body side is not closed.

In the shock absorber 2, the spring receiver 42 can be removed from the inner rod 30 by removing the nut 12 without pulling out the pin 52 from the spring receiver 42. Therefore, according to the shock absorber 2, compared with the shock absorber 1, the time required for replacement of the suspension spring 40 can be shortened. In addition, it is easier to form the notch portion 35 in the inner rod 30 than to form the long hole 34. In the shock absorber 2, the pin 52 and the spring receiver 42 may be formed integrally without making the pin 52 detachable from the spring receiver 42.

Such a shock absorber 2 can set the load of the suspension spring 40 with a simple configuration, similarly to the shock absorber 1.

Third Embodiment

Another embodiment of the invention will be described below.

Figure 6A:
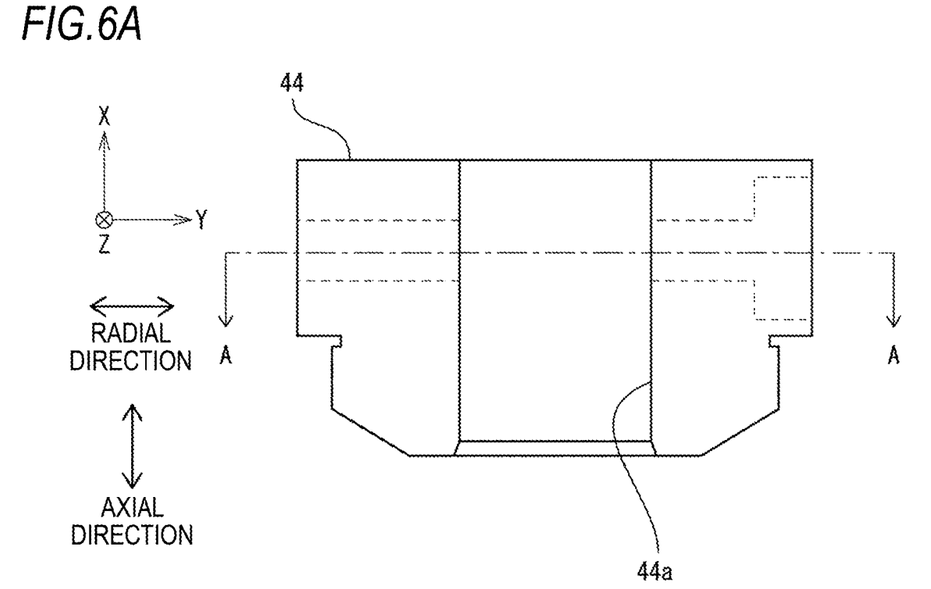
FIG. 6A is a side view of a spring receiver according to a third embodiment.
Figure 6B:
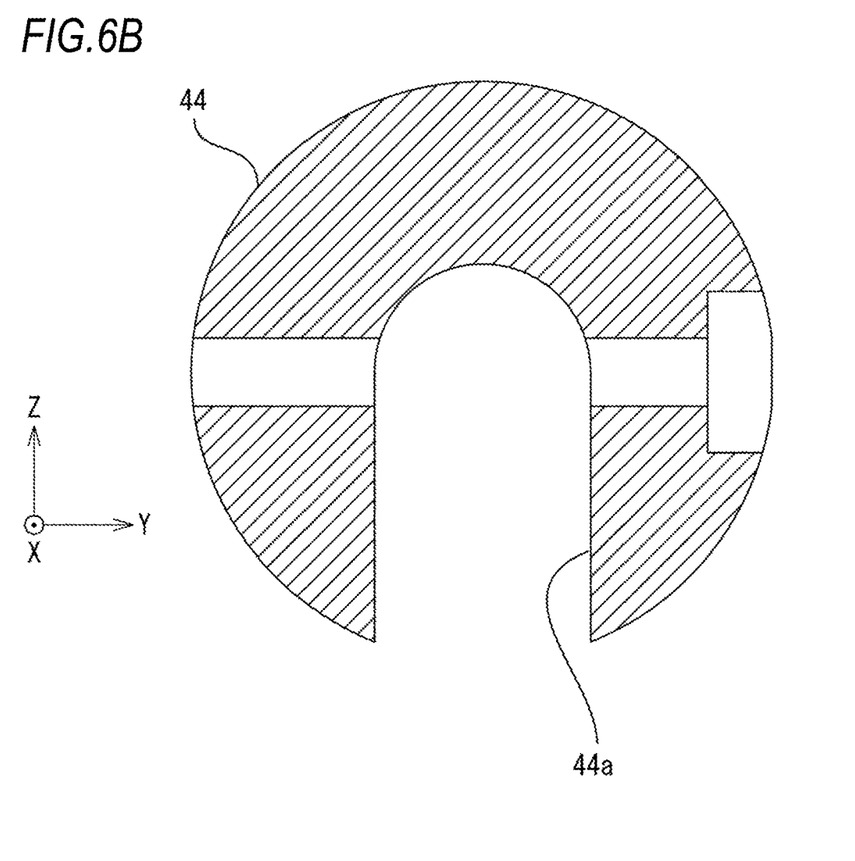
FIG. 6B is a cross-sectional view taken along the line A-A in FIG. 6A.

FIG. 6A is a side view of a spring receiver 44 according to the embodiment. FIG. 6B is a cross-sectional view taken along the line A-A in FIG. 6A.

The spring receiver 44 is a member which can be used in place of the spring receiver 42 in the shock absorber 1 or 2 described above. The spring receiver 44 has a shape in which a part of the cylindrical shape is removed. Specifically, as illustrated in FIG. 6A, the spring receiver 44 has an insertion portion 44a extending in the axial direction. The first rod 31 is inserted into the insertion portion 44a. In addition, the insertion portion 44a is not a through hole having a closed contour. In the cross section (the cross section illustrated in FIG. 6B) when the insertion portion 44a is cut along a plane perpendicular to the axial direction, a part of the contour of the insertion portion 44a is opened. This open portion is formed over the entire axial direction of the spring receiver 44, as illustrated in FIG. 6A.

Therefore, when the spring receiver 44 is removed from the inner rod 30, if the pin 52 is pulled out from the spring receiver 44, the spring receiver 44 can be removed in the radial direction without removing the nut 12. Therefore, when the shock absorber 1 or 2 includes the spring receiver 44, the time required to replace the suspension spring 40 can be shortened as compared with a case where the shock receiver 1 or 2 includes the spring receiver 42.

The invention is not limited to the embodiments described above and various modifications are possible within the scope of the claims. Embodiments obtained by appropriately combining technical means disclosed in different embodiments are also included in the technical scope of the invention.

REFERENCE SIGNS LIST 1, 2 shock absorber
10 outer tube (cylinder)
11 cap member
12 nut
13 operation portion
30 inner rod (hollow rod)
34 long hole (insertion portion)
35 notch portion (insertion portion)
40 suspension spring
42, 44 spring receiver
43 spring collar
51 adjusting screw
52 pin (shaft member)

The invention claimed is:

1. A shock absorber, comprising:
a hollow rod;
a suspension spring arranged outside the hollow rod;
a spring receiver arranged to be displaceable with respect to the hollow rod and receiving a load of the suspension spring;
an adjusting screw inserted into one end side of the hollow rod and configured to adjust a position of the suspension spring by restricting movement of the spring receiver to the one end side; and
a shaft member which transmits a load received by the spring receiver to the adjusting screw inside the hollow rod, wherein
an insertion portion which extends in an axial direction of the hollow rod and into which the shaft member is inserted is provided on a side surface of the hollow rod,
a nut configured to fix a relative position of the hollow rod to a shock absorber body is further provided, and
the nut is disposed closer to the one end side than the spring receiver.

2. The shock absorber according to claim 1, wherein the insertion portion is an opening portion having a closed contour.

3. The shock absorber according to claim 2, further comprising:
a cylinder arranged outside the suspension spring; and
a cap member which is disposed in an opening portion on one end side of the cylinder and into which the hollow rod is inserted.

4. The shock absorber according to claim 3, further comprising:
a spring collar arranged between the spring receiver and the suspension spring.

5. The shock absorber according to claim 3, wherein at least a part of one end side of the adjusting screw is disposed inside the cap member, and
the cap member has an operation portion which rotates the adjusting screw.

6. The shock absorber according to claim 2, further comprising:
a spring collar arranged between the spring receiver and the suspension spring.

7. The shock absorber according to claim 1, further comprising:
a cylinder arranged outside the suspension spring; and
a cap member which is disposed in an opening portion on one end side of the cylinder and into which the hollow rod is inserted.

8. The shock absorber according to claim 7, wherein at least a part of one end side of the adjusting screw is disposed inside the cap member, and
the cap member has an operation portion which rotates the adjusting screw.

9. A shock absorber, comprising:
a hollow rod;
a suspension spring arranged outside the hollow rod;
a spring receiver arranged to be displaceable with respect to the hollow rod and receiving a load of the suspension spring;
an adjusting screw inserted into one end side of the hollow rod and configured to adjust a position of the suspension spring by restricting movement of the spring receiver to the one end side; and
a shaft member which transmits a load received by the spring receiver to the adjusting screw inside the hollow rod, wherein
an insertion portion which extends in an axial direction of the hollow rod and into which the shaft member is inserted is provided on a side surface of the hollow rod, and the shaft member is detachable from the spring receiver.

10. The shock absorber according to claim 1, further comprising:
a spring collar arranged between the spring receiver and the suspension spring.

11. The shock absorber according to claim 7, further comprising:

a spring collar arranged between the spring receiver and the suspension spring.

\* \* \* \* \*